United States Patent
Carlini et al.

(10) Patent No.: US 8,815,394 B2
(45) Date of Patent: *Aug. 26, 2014

(54) ENCAPSULATED NANOSCALE PARTICLES OF ORGANIC PIGMENTS

(75) Inventors: Rina Carlini, Oakville (CA); Roger E. Gaynor, Oakville (CA); Paul F. Smith, Oakville (CA)

(73) Assignee: Xerox Corporation, Norwalk, CT (US)

( * ) Notice: Subject to any disclaimer, the term of this patent is extended or adjusted under 35 U.S.C. 154(b) by 828 days.

This patent is subject to a terminal disclaimer.

(21) Appl. No.: 12/400,385

(22) Filed: Mar. 9, 2009

(65) Prior Publication Data

US 2009/0227711 A1    Sep. 10, 2009

Related U.S. Application Data

(60) Provisional application No. 61/034,758, filed on Mar. 7, 2008.

(51) Int. Cl.
| | |
|---|---|
| C08K 5/3437 | (2006.01) |
| C08K 5/23 | (2006.01) |
| C08G 18/63 | (2006.01) |
| C08G 18/08 | (2006.01) |
| C09D 11/00 | (2014.01) |
| C09D 11/02 | (2014.01) |
| C09B 67/46 | (2006.01) |
| C09B 67/08 | (2006.01) |

(52) U.S. Cl.
CPC ............ *C09B 67/0013* (2013.01); *C09D 11/00* (2013.01); *C09D 11/037* (2013.01); *C09B 67/009* (2013.01); *C09D 11/322* (2013.01)
USPC .......... 428/402.2; 427/212; 524/90; 524/190; 524/700; 524/714; 106/493; 106/495; 106/497; 106/498; 106/402

(58) Field of Classification Search
USPC .............. 428/403, 404, 42.2; 430/110.2, 110, 430/111, 137; 106/491, 496, 402; 524/90, 524/190, 88
See application file for complete search history.

(56) References Cited

U.S. PATENT DOCUMENTS

| | | | | |
|---|---|---|---|---|
| 5,120,632 | A | * | 6/1992 | Bertrand et al. ............ 430/110.2 |
| 5,384,222 | A | | 1/1995 | Normandin et al. |
| 5,679,138 | A | | 10/1997 | Bishop et al. |
| 5,952,131 | A | | 9/1999 | Kumacheva et al. |
| 5,994,020 | A | * | 11/1999 | Patel et al. ................ 430/137.14 |
| 7,008,977 | B2 | | 3/2006 | Sakai et al. |
| 7,427,323 | B1 | | 9/2008 | Birau et al. |
| 7,427,324 | B1 | * | 9/2008 | Birau et al. ..................... 106/497 |
| 7,465,348 | B1 | | 12/2008 | Carlini et al. |
| 7,465,349 | B1 | | 12/2008 | Carlini et al. |
| 2005/0109240 | A1 | | 5/2005 | Maeta et al. |
| 2006/0063873 | A1 | | 3/2006 | Lin et al. |
| 2007/0012221 | A1 | | 1/2007 | Maeta et al. |
| 2007/0224345 | A1 | * | 9/2007 | Metz et al. ..................... 427/212 |
| 2008/0119601 | A1 | | 5/2008 | Nennemann et al. |

FOREIGN PATENT DOCUMENTS

| | | |
|---|---|---|
| DE | 102004020726 A1 | 11/2005 |
| JP | 2003306508 A | 10/2003 |
| WO | 02090446 A1 | 11/2002 |
| WO | 2006/005536 | 1/2006 |
| WO | 2006/132443 | 12/2006 |

OTHER PUBLICATIONS

K. Balakrishnan et al., "Effect of Side-Chain Substituents on Self-Assembly of Perylene Diimide Molecules: Morphology Control," *J. Am. Chem. Soc.*, vol. 128, pp. 7390-7398 (2006).

Frank Caruso et al., "Microencapsulation of Uncharged Low Molecular Weight Organic Materials by Polyelectrolyte Multilayer Self-Assembly," *Langmuir*, vol. 16, pp. 8932-8936 (2000).

Hideki Maeta et al., "New Synthetic Method of Organic Pigment Nano Particle by Micro Reactor System," http://aiche.confex.com/aiche/s06/preliminaryprogram/abstract_40072.htm (date unknown).

Tsuchida, et al., "Coordination Property of Poly(1-vinyl-2-Methylimidazole)-Heme Complexes," *J Inorg. Chem.*, v.17, pp. 283-291 (1982).

Widiyandari et al., "Preparation and Characterization of Nanopigment-Poly(styrene-co-η-butyl acrylate-co-methacrylic acid) Composite Particles by High Speed Homogenization-Assisted Suspension Polymerization," *J. App. Polym. Sci.*, 108, pp. 1288-1297 (2008).

Yuan J. et al., "Cross-Linking of Cationic Block Copolymer Micelles by Silica Deposition", *JACS Articles, J. Am Chem. Soc.* 2007, 129, pp. 1717-1723.

Wooley, K., "Shell Crosslinked Polymer Assemblies: Nanoscale Constructs Inspired from Biological Systems", *Journal of Polymer Science: Part A: Polymer Chemistry*, vol. 38, 2000, pp. 1397-1407.

U.S. Appl. No. 12/102,363 to Roger E. Gaynor et al., filed Apr. 14, 2008.

(Continued)

*Primary Examiner* — James J Seidleck
*Assistant Examiner* — S. Camilla Pourbohloul
(74) *Attorney, Agent, or Firm* — Pillsbury Winthrop Shaw Pittman LLP

(57) ABSTRACT

Encapsulated nanoscale particles of organic pigments include a polymer-based encapsulating material, and one or more nanoscale organic pigment particles encapsulated by the polymer-based encapsulating material. Such encapsulated nanoscale particles of organic pigments can be made by providing nanosized organic pigment particles comprised of surface-associated sterically bulky stabilizer compounds; providing a copolymer material comprising organic pigment-affinic functional groups and non pigment affinic monomer units; associating the nanoscale organic pigment particles with the copolymer material so as to effect a deposited layer or shell of the copolymer material around said nanoscale organic pigment particles, thereby producing an encapsulated nanoscale organic pigment particle; and optionally further reinforcing the encapsulated nanosized organic pigment particle with one or more surface treatments.

23 Claims, No Drawings

(56) References Cited

OTHER PUBLICATIONS

Canadian Patent Office, Office Action received Sep. 6, 2011 in Canadian Application No. 2,728,758.

Canadian Office Action issued in Canadian Patent Application No. 2,728,758 dated Nov. 4, 2013.

Chinese Patent Office, Third Office Action issued Aug. 14, 2013 in Chinese Patent Application No. 200980116209.1 w/English-language Translation and Text of Third Office Action.

Supplementary European Search Report for Application No. EP09730758, Feb. 4, 2014.

* cited by examiner

ENCAPSULATED NANOSCALE PARTICLES OF ORGANIC PIGMENTS

This application is a non-provisional application of U.S. Provisional Application No. 61/034,758, filed Mar. 7, 2008, the entire disclosure of which is incorporated herein by reference.

TECHNICAL FIELD

This disclosure is generally directed to encapsulated nanoscale particles of organic pigments, methods for producing such encapsulated nanoscale particles of organic pigments, and uses thereof. More specifically, this disclosure is directed to polymer-encapsulated nanoscale particles of organic pigments associated with a sterically bulky stabilizer compound on the particle surface, and methods for producing such compositions. Such particles are useful, for example, as nanoscopic colorants for such compositions as inks, toners and the like.

CROSS-REFERENCE TO RELATED APPLICATIONS

Disclosed in U.S. Pat. No. 7,465,348 to Rina Carlini et al. is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles.

Disclosed in U.S. Pat. No. 7,465,349 to Rina Carlini et al. is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium; combining the first reaction mixture into the second reaction mixture to form a third mixture and effecting a direct coupling reaction which forms a monoazo laked pigment composition wherein the functional moiety associates non-covalently with the functional group and having nanoscale particle size. Further disclosed in U.S. Pat. No. 7,465,349 is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in U.S. Pat. No. 7,427,323 to Maria Birau et al is a nanoscale pigment particle composition, comprising: a quinacridone pigment including at least one functional moiety, and a sterically bulky stabilizer compound including at least one functional group, wherein the functional moiety of the pigment associates non-covalently with the functional group of the stabilizer; and the presence of the associated stabilizer limits the extent of particle growth and aggregation, to afford nanoscale-sized particles.

Disclosed in U.S. Pat. No. 7,427,324 is a process for preparing nanoscale quinacridone pigment particles, comprising: preparing a first solution comprising: (a) a crude quinacridone pigment or pigment precursor including at least one functional moiety and (b) a liquid medium; preparing a second solution comprising: (a) a sterically bulky stabilizer compound having one or more functional groups that associate non-covalently with the pigment functional moiety, and (b) a liquid medium; combining the first solution into the second solution to form a third reaction mixture which forms a quinacridone pigment composition of nanoscale particle size and wherein the functional moiety of the pigment associates non-covalently with the functional group of the stabilizer. Further disclosed in U.S. Pat. No. 7,427,324 is a process for preparing nanoscale quinacridone pigment particles, comprising: preparing a first solution comprising a quinacridone pigment including at least one functional moiety in an acid; preparing a second solution comprising an liquid medium and a sterically bulky stabilizer compound having one or more functional groups that associate non-covalently with the functional moiety of the pigment; treating the second solution with the first solution to precipitate quinacridone pigment of nanoscale particle size, wherein the functional moiety of the pigment associates non-covalently with the functional group of the stabilizer.

Disclosed in U.S. patent application Ser. No. 12/102,363 to Roger Gaynor et al. is a composition comprising: nanoscale quinacridone pigment particles, and methods for producing such nanoscale quinacridone pigment particles. The nanoscale quinacridone pigment particles include a rosin compound as a surface additive, which not only helps to provide the nanoscale sized particles, but also improves dispersability and stability of the nanoscale quinacridone pigment particles in ink vehicles. The disclosure provides a process for preparing coated nanoscale quinacridone pigment particles, by 1) dissolving a crude quinacridone pigment or quinacridone pigment precursor into the first solution comprising a surface additive compound such as rosin compounds that are dissolved into strong acid; and 2) causing said surface additive compound to coat formed nanoscale quinacridone pigment particles; and 3) adding the first acid solution containing coated nanoscale quinacridone pigment particles into a second solution comprising deionized water and optional solvents, neutralizing agents such as ammonia, or additives such as defoaming agents, to thereafter form a third mixture comprised of precipitated, coated nanoscale quinacridone pigment particles. The coated nanoscale quinacridone pigment particles can also be left in wetted form for facile dispersion directly in an ink formulation.

The entire disclosures of the above-mentioned applications are totally incorporated herein by reference.

BACKGROUND

Pigments are a class of colorants useful in a variety of applications such as, for example, paints, plastics and inks, including inkjet printing inks. Dyes have typically been the colorants of choice for inkjet printing inks because they are readily soluble colorants which enable jetting of the ink. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water-/solvent-fastness). In certain situations, pigments are the better alternative as colorants for inkjet printing inks since they are insoluble, have higher chemical and thermal stability compared to dyes, and since they are not molecularly dissolved within the ink matrix but rather dispersed as fine particles in the ink, do not generally experience colorant diffusion. Pigments can also be significantly less expensive than dyes, and so are increasingly attractive colorants for inkjet printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example, inkjet inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost.

The following documents provide background information:

U.S. Pat. No. 7,008,977 discloses colored fine resin particles having a structure in which a conventional, sub-micron sized pigment particles with diameters of about 500 nm, which are coated with a water-insoluble resin is encapsulated with a copolymer composed of at least a polymerizable unsaturated monomer and reactive emulsifier. Examples provided in the invention provided use dry commercial pigments that were pre-processed with resinous surface additives to aid dispersability in a monomer matrix. In some of the examples, media milling of the commercial dry pigments was necessary to reduce the pigment particle size and thereby enable dispersion and eventual coating with the in situ polymerized monomer. None of the examples described the preparation or use of nanosized particles of organic pigments as a raw material.

In J. App. Polym. Sci. 2008, 108, 1288 by Widiyandari et al., is described the preparation of micron-sized, spherical composite particles of pigments and polymers for use in printing inks and toners. In the article is described the use of nanosized phthalocyanine pigment particles that are core-shell particles comprised of silica in the nanoparticle core, and Pigment Blue 15:3 in the shell. The composite polymer/pigment particles are prepared by suspension-polymerization of monomers in the presence of dispersed pigment particles, thereby producing spherical micron-size composite particles ranging in particle diameter of about 4.4 to 7.4 microns. There is no description of the process for making the nanosized particles of Pigment Blue 15:3 in this article.

U.S. Patent Application Publication No. 2008/0119601 A1 discloses nanoparticle-modified polyisocyanate compositions, a process for their preparation, and their use in coating and adhesive compositions. The compositions are prepared by chemically reacting polyisocyanate compounds with an alkoxysilane (a silica precursor agent) and subsequently incorporating by dispersion the resultant inorganic nanoparticles such as silica, which are optionally surface-modified and have average particle diameters of less than 200 nm. The patent application is limited to only inorganic nanoparticles, which are modified via chemical bonding with the reactive groups of the polyisocyanate compound.

Hideki Maeta et al., "New Synthetic Method of Organic Pigment Nano Particle by Micro Reactor System," in an abstract available on the internet at URL address: http://aiche.confex.com/aiche/s06/preliminaryprogam/abstract_40072.htm, which describes a new synthetic method of an organic pigment nanoparticle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

U.S. Pat. No. 5,679,138 discloses a process for making inkjet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

Thus, there is a need addressed by embodiments of the present invention, for smaller nanoscale pigment particles that can be more easily dispersed into various ink and polymer matrices, including various non-polar inkjet ink matrices such as hydrocarbon oils, and wax-based solid inks, and have excellent particle dispersion and thermal stability in such matrices, so as to minimize or avoid the problems associated with conventional larger-sized pigment particles and ensure reliable jetting of a nano-pigmented ink from a piezoelectric printhead. There further remains a need for compositions and processes for making and using such improved nanoscale pigment particles as colorant materials, particularly for inkjet inks and toners. The present nanoscale pigment particles are also useful in, for example, paints, various performance coatings and all types of printing inks (including inkjet inks) and other compositions where pigments can be used such as plastics, optoelectronic imaging components, photographic components, and cosmetics among others.

The present disclosure addresses these and other needs, by providing encapsulated nanoscale particles of organic pigments, methods for producing such encapsulated nanoscale particles of organic pigments, and uses thereof. More specifically, the present disclosure provides polymer-encapsulated nanoscale particles of organic pigments that are comprised of a surface-associated, sterically bulky stabilizer compound on the particle surface. The present disclosure also provides methods for producing such compositions, and uses thereof, such as for non-polar inkjet ink matrices.

In an embodiment, the present disclosure provides encapsulated nanoscale particles of organic pigments, comprising:
a polymer-based encapsulating material, and
one or more nanoscale organic pigment particles encapsulated by the polymer-based encapsulating material.

In another embodiment, the present disclosure provides a process for preparing polymer encapsulated nanoscale particles of organic pigments, comprising:
providing nanosized organic pigment particles comprised of surface-associated sterically bulky stabilizer compounds;
providing a copolymer material comprising organic pigment-affinic functional groups and non pigment affinic monomer units;
associating the nanoscale organic pigment particles with the copolymer material so as to effect a deposited layer or shell of the copolymer material around said nanoscale organic pigment particles, thereby producing an encapsulated nanoscale organic pigment particle; and
optionally further reinforcing the encapsulated nanosized organic pigment particle with one or more surface treatments.

DETAILED DESCRIPTION OF EXEMPLARY EMBODIMENTS

Embodiments of the present disclosure provide encapsulated nanoscale particles of organic pigments, methods for producing such encapsulated nanoscale particles of organic pigments, and uses thereof. The encapsulated nanoscale particles of organic pigments generally comprise one or more organic pigments whose surface is encapsulated or deposited with a polymer-based encapsulating material, which in turn can optionally be coated, reinforced with filler nanoparticles or nanoscale fibers, or functionalized by chemical grafting or by non-covalent chemical treatments for improved dispersion and robustness properties. The polymer-based encapsulating encapsulant material both provides structural and thermal stability to the particles, while providing excellent coloristic properties. Furthermore, because only the surface properties of the encapsulating material is varied, and not the physical or chemical properties of the specific organic nanoscale pigment contained within the core of the particle, then the desired performance properties of any organic nanoscale pigment can be readily provided for a particular application by simply tuning the chemistry of the polymer encapsulant, instead of having to re-engineer the crystalline structure, shape characteristics, and manufacturing process of the nanoscale organic pigment for each desired application.

The encapsulated nanoscale particles of organic pigments contain either one type of pigment or mixtures of pigments, and also contain an associated steric stabilizer compound as a surface additive. The steric stabilizer can have the potential to associate itself non-covalently with the functional moieties of the pigment by various modes including for example, hydrogen bonding, van Der Waals forces, and aromatic pi-stacking, or combinations thereof That is, the steric stabilizer associated on the nanoparticle pigment surface provides a functional group that is complementary to a functional moiety of the pigment, such that during the method of preparing the nanoscale pigment particles in the presence of the suitably chosen steric stabilizer, there is controlled crystallization of organic pigment nanoparticles that is limited in particle growth by the action of the associated stabilizer additives.

In embodiments, nano-sized particles of quinacridone pigment can be prepared by the various methods disclosed in U.S. Pat. No. 7,427,323, U.S. Pat. No. 7,427,324, and U.S. patent application Ser. No. 12/102,363 (Xerox Corporation), which are totally incorporated herein by reference, and involve the solubilization of crude quinacridone pigments, or pigment precursor, into an acidic liquid (a technique commonly known as "acid pasting") followed by reprecipitation of the pigment as nanoparticles or nanocrystals from a quenching non-solvent mixture. In this process, a steric stabilizer or surface additive compound is first solubilized or dispersed in the acid medium which is optionally heated and/or maintained at a desired temperature, such as from about 0° C. to about 100° C., or preferably between about 20° C. to about 80° C., or most preferably between about 30° C. to about 60° C. The strong acid can be either, for example, a mineral acid, an organic acid, or a mixture thereof. Examples of strong mineral acids, which are preferred in this process, include sulfuric acid, nitric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Alternatively, examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like. The amount of acid solution can be selected such that after pigment addition, the acid solution contains pigment in a concentration of 0.5% to 20%, such as 1% to 15% or 2% to 10% by weight, although the values can also be outside these ranges. The crude quinacridone pigment, or pigment precursor, is added to the strong acid solution containing the dissolved surface additive. The dissolution or suspending of pigment particles within the strong acid solution can be performed at any desired temperature, such as from about 0° C. to about 100° C., or about 20° C. to about 80° C., or preferably from about 40° C. to about 60° C. In embodiments, the acid medium is heated to a temperature above room temperature, since higher temperature assists in the dissolution of the surface additive as well as the subsequent dissolution of the crude pigment or pigment precursor. Once the pigment material is added to this first acid solution, the solution can be held as desired and stirred for an amount of time to allow suitable and desired mixing or surface adhesion of the pigment particles by the additive.

Any suitable liquid medium can be used to carry out the re-precipitation of the quinacridone pigment in the presence of a polymer-based encapsulant material, so as to afford surface coated or polymer-encapsulated nanoscale pigment particles. Desirably, the re-precipitation can be carried out in deionized water, and optionally in the presence of an organic co-solvent or emulsifying agent that aids with dispersion of polymer-encapsulant material, and will not dissolve the pigment nanoparticles nor surface additive. The second solution, in which the re-precipitation is carried out, thus desirably includes deionized water as the major component. Suitable candidates for the optional organic co-solvent include, but are not limited to, short-chain alcohols such as methanol, ethanol, 1-propanol, 2-propanol, 1-butanol, 2-butanol; higher order or branched or cyclic alcohols such as cyclohexanol, ethylene glycol, diethylene glycol, propylene glycol, dipropylene glycol, mono-alkyl ethers of diethylene or dipropylene glycols such as DOWANOL®, and the like; alkyl ethers such as tetrahydrofuran, dimethoxyethane, dimethoxypropane, and the like; polar aprotic solvents such as ethyl acetate, butyl acetate, methoxypropyl acetate, N-methylpyrrolidinone, sulfolane, N,N-dimethylformamide, N,N-dimethylacetamide, and the like; hydrocarbon solvents such as hexanes, toluene, xylenes, Isopar solvents, and mixtures thereof. The optional precipitating agent can also be ammonia solution (concentrated solution or other percentages). The organic cosolvent can be optionally added in a range of about 1% to about 80% by volume out of the total volume of the mixture, such as between about 5% and about 50%, or between about 10% and about 30%, although the desired value can also be outside these ranges. The formation of the nanoscale quinacridone pigment particles can be conducted by adding the first strong acid solution containing dissolved pigment and surface additive to this second (re-precipitation) solution under vigorous agitation such as by use of high-speed mechanical stirring or homogenization or other means.

The pigment re-precipitation process can be conducted at any desired temperature to allow the formation of quinacridone pigment nanoparticles having a surface-deposited shell or layer of polymer-based encapsulant material. For example, the re-precipitation can be conducted at a temperature of from about 0° to about 90° C., such as from about 0° to about 50° C., or from about 0° to about 25° C., although temperatures outside of these ranges can be used, if desired. In one embodiment, the re-precipitation can be performed essentially isothermally, where a substantially constant temperature is maintained, while in another embodiment, the temperature during re-precipitation can be allowed to fluctuate within a desired range, where the fluctuation can be cyclic or the like.

As used herein, the reference to "encapsulated" or to the formation of a layer refers to the one or more nanoscale organic pigment particles being covered by the polymer-based encapsulating material. Thus, for example, the polymer-based encapsulating material can form a layer or shell around the pigment particles, and/or encapsulate the pigment particles.

Once the re-precipitation is complete, the quenched mixture is strongly acidic and can be neutralized by adding a suitable base to the solution, such as concentrated or aqueous ammonia solution. Other suitable neutralizing agents can include hydroxides, carbonates or bicarbonates f Group 1 or Group 2 metals such as NaOH, KOH, $Na_2CO_3$, $K_2CO_3$, and the like. Once the neutralization is complete, the polymer-encapsulated quinacridone pigment nanoparticles can be separated from the solution by any conventional means, such as for example, vacuum-filtration methods or centrifugal separation methods. The nanoparticles can also be processed for subsequent use according to known methods.

In embodiments of the present disclosure, and as disclosed previously in U.S. patent application Ser. No. 12/102,363 and in U.S. Pat. No. 7,427,323, the disclosures of which are totally incorporated herein by reference, the encapsulated nanoscale particles of organic pigments can also contain an associated steric stabilizer compound as a surface additive. The steric stabilizer functions by associating itself non-covalently with the functional moieties of the pigment using various modes including, hydrogen bonding, van Der Waals forces, and aromatic pi-stacking, or combinations thereof, such that during the preparation of the nanoscale pigment particles by the above method in the presence of a suitable steric stabilizer, there is controlled crystallization of organic pigment nanoparticles and limited pigment particle growth, due to the action of the associated stabilizer additives.

Representative steric stabilizers as surface additives to enable controlled pigment crystallization and formation of nanoscale quinacridone particles include but are not limited to, the following: a) esters of sorbitol with palmitic acid (SPAN® 40), stearic acid (SPAN® 60) and oleic acid (SPAN® 85) or mixtures thereof, where the aliphatic chain of the acid is at least C10 or higher; b) tartaric acid esters with linear, branched or cyclic alcohols such as cyclohexanol, Isofol 20 (available from Sasol America); c) rosin-based natural compounds and synthetic derivatives, including functional classes such as rosins, rosin esters, rosin acids, rosin salts, or the like, that have the function of coating the pigment particles to limit the extent of pigment particle or molecular self-assembly so as to produce predominantly nanoscale-sized pigment particles. The rosin compounds can be hydrogenated or not for any of the aforementioned classes. Specific examples of commercially available rosin compounds include, for example, hydrogenated rosin esters (such as Pinecrystal KE-100 or KE-311 manufactured by Arakawa Kagaku Co., Ltd.), hydrogenated rosin glycerol esters, levopimaric acid, neoabietic acid, palustric acid, abietic acid, dehydroabietic acid, seco-dehydroabietic acid, tetrahydroabietic acid, dihydroabietic acid, pimaric acid, and isopimaric acid, calcium resonates, sodium resonates, zinc resonates, magnesium resonates, barium resonates, lead resonates, cobalt resonates, mixed resonates (such as calcium and zinc resonates), sodium salts of rosins (such as DRESINATE X™ from Hercules Paper Technology Group), alkyl esters of rosin or hydrogenated rosin (such as HERCOLYN D™, a methyl ester of hydrogenated rosin from Hercules, Inc., and ABALYN™, a methylester of rosin from Hercules, Inc.), mixtures thereof, and the like.

The polymer-based encapsulating material can be added to the re-precipitation solution as disclosed above, or alternatively introduced to the organic pigment nanoparticles after they are synthesized and isolated from the re-precipitation solution. In the latter case, the polymer-based encapsulating material is preferably introduced and deposited onto wetted pigment nanoparticles that are already suspended within a suitable liquid. The pigment nanoparticles can be wetted with any suitable or desired liquid, including: polar liquids such as water, alcohols, or other water-miscible liquids such as glycols and the like; aprotic and non-polar liquids such as simple ketones and esters like acetone, methyl ethyl ketone, methyl isobutyl ketone, cyclohexanone, ethyl acetate, butyl acetate, methoxypropyl acetate, N-methylpyrrolidinone, sulfolane, N,N-dimethylformamide, N,N-dimethylacetamide, and the like; ethers such as tetrahydrofuran, dimethoxyethane, monoalkyl ethers of diethylene or dipropylene glycols such as DOWANOL® and the like; and mixtures thereof; and hydrocarbon liquids such as hexanes, toluene, xylenes, Isopar and the like; and mixtures thereof The polymer-based encapsulating material can be selected from the following classes of polymer compounds, including but not limited to: homopolymers and copolymers of poly(vinylpyrrolidone), homopolymers and copolymers of poly(styrene) or poly(styrene 4-sulfonate), homopolymers and copolymers of poly(4-vinylpyridine); homopolymers and copolymers of poly(vinylimidazole); homopolymers and copolymers of poly(vinylbutyral); homopolymers and copolymers of polyesters, amide-terminated polyesters, polyamides, and ester-terminated polyamides that are each prepared from alkanedioic acid monomers and/or alkanediol monomers; homopolymers and copolymers of succinate diesters, succinic acid diamides, succinic anhydrides or succinimides, including the reaction products of polyalkyleneamines and polyisobutylene succinic anhydrides or polyisobutylene succinimides.

The polymer encapsulant material can be added into the treatment process for surface deposition or encapsulation of the nanoscale organic pigment particle in any desired amount that is suitable for a particular application. For the purpose of creating polymer-encapsulated nanoscale particles of organic pigments that are suitable for dispersion into a non-polar, non-aqueous medium, such as for example hydrocarbon liquids like hexanes, toluene, xylenes, Isopar and the like, the amount of polymer encapsulant material is loaded based on the weighted mass of nanoscale pigment to be treated, and can range from about 1 wt % to about 100 wt % or from about 5 wt % to about 75 wt %, or preferably from about 10 wt % to about 50 wt %, although it can also be outside of these ranges. The temperature used for the treatment of the nanoscale organic pigment particles with the polymer-based encapsulant is preferably done at room temperature, although the temperature can also range from about 10° C. to about 80° C., or from about 20° C. to about 50° C., or any temperature outside this range. The polymer-based encapsulant material is preferably introduced into a prepared suspension of the wetted nanoscale organic pigments under vigorous agitation such as by use of high-speed mechanical stirring or homogenization or other means.

Representative examples of suitable polymer-based encapsulating material that are deposited as a surface layer or shell encapsulating the nanoscale particles of quinacridone type pigments, either during the synthesis process of preparing the pigment nanoparticles by reprecipitation or after recovery of the pigment nanoparticles, include but are not limited to the following: poly(1-vinylpyrrolidone), poly(1-vinylpyrrolidone)-graft-(1-hexadecene), poly(1-vinylpyrrolidone)-graft-(1-triacontene), poly(1-vinylpyrrolidone-co-acrylic acid), poly(1-vinylpyrrolidone-co-N,N-dimethylaminoethylmethacrylate), poly(vinylimidazole), poly(styrene-alt-maleic anhydride), poly(vinyl alcohol-co-vinyl acetate-co-vinyl butyral)terpolymer commercially known as Mowital® B30HH (available from Hoechst A. G.), succinimide-based commercial polymers such as the OLOA® family of polyisobutylene succinimide dispersants (available from Chevron Oronite), succinimide-based dispersants such as Ircosperse® 2153 (available from Lubrizol Corp., Cleveland, Ohio), poly(styrene-co-4-vinylpyridine) such as is described in U.S. Pat. No. 5,384,222 by Xerox Corp., dispersants based on polyesters, amide-terminated polyester, polyamides and ester-terminated polyamides such as the Solsperse Hyperdispersants®, including Solsperse® 17000 (available from Lubrizol Corp.), and the like.

In embodiments, the nanoscale particles of quinacridone pigments, when properly prepared using the exemplary conditions in the presence of steric stabilizers, were desirably ultrafine in particle size. For example, the material desirably has an average particle size of less than about 100 nm, such as about 10 nm to about 20 nm, about 40 nm, about 60 nm, or about 80 inn, measured as an average particle diameter (length) images obtained by Transmission Electron Microscopy (TEM). The shape of the nanosized pigment particles can be one or more of several morphologies, including rods, platelets, needles, prisms or nearly spherical, and the [length: width] aspect ratio of the nanoscale pigment particles can range from 1 to about 10, such as having aspect ratio between 1 and 5; however the actual ratio can also lie outside of these ranges.

Organic monoazo "laked" pigments are the insoluble metal salts of monoazo colorants which can include monoazo dyes or pigments. The process of ion complexation with a metal salt, or "laking" process, provides decreased solubility of the non-ionic monoazo pigment, which can enhance the migration resistance and thermal stability properties of a monoazo pigment, and thereby enable the applications of such pigments for robust performance. Formula I depicts a general representation of monoazo laked pigments, which are ionic compounds that are structurally comprised of a diazo group (denoted $G_d$) and a nucleophilic coupling group (denoted as $G_c$) that are linked together with one azo (N=N) functional group, and a cation ($M^{n+}$) which is typically a metal salt.

Either or both of the groups $G_d$ and $G_c$ can contain one or more ionic functional moieties such as sulfonate or carboxylate anions or the like.

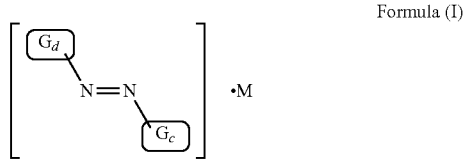

Formula (I)

As an example, the organic monoazo laked pigment Pigment Red (PR) 57:1 has two different ionic functional moieties, a sulfonate anion group ($SO_3^-$) and carboxylate anion group ($CO_2^-$), along with a metal counter-cation $M^{n+}$ that is chosen from Group 2 alkaline earth metals such as $Ca^{2+}$. Other monoazo laked pigment compositions also exist that have a counter-cation chosen from either Group 2 alkaline earth metals (Be, Mg, Ca, Sr, Ba,), Group 3 metals (B, Al, Ga), Group 1 alkali metals (Li, Na, K, Cs), the transition metals such as Cr, Mn, Fe, Ni, Cu, Zn, or others non-metallic cations such as ammonium ($N_4^+$), phosphonium ($PR_4^+$) wherein R-group can be H or alkyl group having from about 1 to about 12 carbons. Further, the azo group in the compounds can generally assume one or more tautomeric forms, such as the "azo" tautomer form which has the (N=N) linkage, and the "hydrazone" tautomer form which has the (C=N—NH—) linkage that is stabilized by an intramolecular hydrogen bond. It has been experimentally shown that the hydrazone tautomer is the preferred structural form for PR 57:1.

ence of a hydrophobic groups on the stabilizer ensures that a physical barrier is present when the stabilizer associates non-covalently on the particle surface, which further enhances the dispersion performance of the pigment. As such, these stabilizer compounds are beneficial surface active agents for nanoscale monoazo laked pigments.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In still other embodiments, the precursor and the organic pigment can have different functional moieties. In embodiments, where the organic pigment and the precursor have a structural feature or characteristic in common, the phrase "organic pigment/pigment precursor" is used for convenience rather than repeating the same discussion for each of the organic pigment and the pigment precursor.

The organic pigment/precursor of monoazo laked pigments can have one or more functional moieties that is capable of non-covalent bonding or association with a complementary functional group that is present on the stabilizer compound. Illustrative functional moieties of the organic pigment/precursor include (but are not limited to) the following: sulfonate/sulfonic acid, (thio)carboxylate/(thio) carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazo-

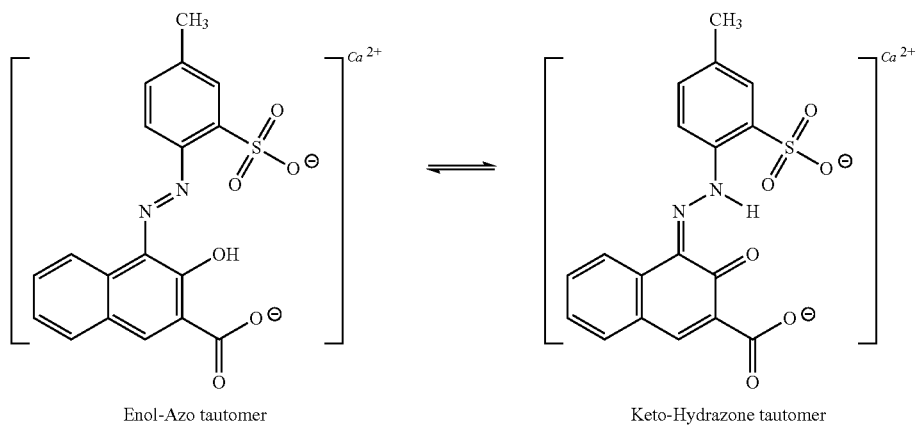

Enol-Azo tautomer                Keto-Hydrazone tautomer

It is understood that formula I denotes both such tautomer forms. Due to the ionic nature of monoazo laked pigments, it is possible to have steric stabilizer compounds that associate non-covalently with the pigment, such as organic or inorganic ionic compounds that can associate directly through ionic or coordination-type bonding, and typically with the counter-cation group like $M^{n+}$. As described previously, these steric "stabilizers" function to reduce the surface tension of the pigment particle, neutralize the attractive forces between two or more pigment particles or structures, and thereby stabilize the chemical and physical structure of the pigment. The preslium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

The organic pigment, and in some embodiments, the organic pigment precursor, also generally includes a counterion as part of the chemical structure. Such counterions can be, for example, cations or anions of either metals or non-metals that include N, P, S and the like, or carbon-based cations or anions. Examples of suitable cations include ions of Ba, Ca, Cu, Mg, Sr, Li, Na, K, Cs, Mn, Cu, Cr, Fe, Ti, Ni, Co, Zn, V, B, Al, Ga, and other metal ions, as well as ammonium and phosphonium cations, mono-, di-, tri-, and tetra-substituted ammonium and phosphonium cations, where the substituents can be aliphatic alkyl groups, such as methyl, ethyl, butyl, stearyl and the like, as well as aryl groups such as phenyl or benzyl and the like. Representative examples of monoazo laked pigments that have the generic structure of Formula I include, but are not limited to, the pigments listed in Table 1.

TABLE 1

$$\left[ \begin{array}{c} \boxed{G_d} \\ | \\ N{=}N \\ | \\ \boxed{G_c} \end{array} \right] \cdot M$$

| Color Index # (C.I.) | Color Index (C.I.) Name | Laked Pigment Class | Metal Salt M |
|---|---|---|---|
| 15500:1 | Red 50:1 | β-Naphthol Lakes | ½ Ba |
| 15510:1 | Orange 17 | β-Naphthol Lakes | Ba |
| 15510:2 | Orange 17:1 | β-Naphthol Lakes | ⅔ Al |
| 15525 | Red 68 | β-Naphthol Lakes | 2 Ca |
| 15580 | Red 51 | β-Naphthol Lakes | Ba |
| 15585 | Red 53 | β-Naphthol Lakes | 2 Na |
| 15585:1 | Red 53:1 | β-Naphthol Lakes | Ba |
| 15585:3 | Red 53:3 | β-Naphthol Lakes | Sr |
| 15602 | Orange 46 | β-Naphthol Lakes | Ba |
| 15630 | Red 49 | β-Naphthol Lakes | 2 Na |
| 15630:1 | Red 49:1 | β-Naphthol Lakes | Ba |
| 15630:2 | Red 49:2 | β-Naphthol Lakes | Ca |
| 15630:3 | Red 49:3 | β-Naphthol Lakes | Sr |
| 15800 | Red 64 | β-oxynaphthoic acid (BONA) Lakes | ½ Ba |
| 15800:1 | Red 64:1 | β-oxynaphthoic acid (BONA) Lakes | ½ Ca |
| 15800:2 | Brown 5 | β-oxynaphthoic acid (BONA) Lakes | ½ Cu |
| 15825:2 | Red 58:2 | β-oxynaphthoic acid (BONA) Lakes | Ca |
| 15825:4 | Red 58:4 | β-oxynaphthoic acid (BONA) Lakes | Mn |
| 15850:1 | Red 57:1 | β-oxynaphthoic acid (BONA) Lakes | Ca |
| 15860:1 | Red 52:1 | β-oxynaphthoic acid (BONA) Lakes | Ca |
| 15860:2 | Red 52:2 | β-oxynaphthoic acid (BONA) Lakes | Mn |
| 15865:1 | Red 48:1 | β-oxynaphthoic acid (BONA) Lakes | Ba |
| 15865:2 | Red 48:2 | β-oxynaphthoic acid (BONA) Lakes | Ca |
| 15865:3 | Red 48:3 | β-oxynaphthoic acid (BONA) Lakes | Sr |
| 15865:4 | Red 48:4 | β-oxynaphthoic acid (BONA) Lakes | Mn |
| 15865:5 | Red 48:5 | β-oxynaphthoic acid (BONA) Lakes | Mg |
| 15867 | Red 200 | β-oxynaphthoic acid (BONA) Lakes | Ca |
| 15880:1 | Red 63:1 | β-oxynaphthoic acid (BONA) Lakes | Ca |
| 15880:2 | Red 63:2 | β-oxynaphthoic acid (BONA) Lakes | Mn |
| 15892 | Red 151 | Naphthol AS Lakes | Ba |
| 15910 | Red 243 | Naphthol AS Lakes | ½ Ba |
| 15915 | Red 247 | Naphthol AS Lakes | Ca |
| 15985:1 | Yellow 104 | Naphthalene Sulfonic Acid Lakes | ⅔ Al |
| 15990 | Orange 19 | Naphthalene Sulfonic Acid Lakes | ½ Ba |
| 16105 | Red 60 | Naphthalene Sulfonic Acid Lakes | ½ Ba |
| 18000:1 | Red 66 | Naphthalene Sulfonic Acid Lakes | ½ Ba, Na |
| 19140:1 | Yellow 100 | Pyrazolone Lakes | Al |
| 18792 | Yellow 183 | Pyrazolone Lakes | Ca |
| 18795 | Yellow 191 | Pyrazolone Lakes | Ca |
| — | Yellow 190 | Pyrazolone Lakes | Ca |
| 13980 | Yellow 151 | Azo-Benzimidazolone | none |
| 12513 | Red 175 | Azo-Benzimidazolone | none |
| 12516 | Red 185 | Azo-Benzimidazolone | none |

In the case of monoazo laked pigments, the steric stabilizer or surface active additive, can be any compound that has the function of controlling the extent of either molecular self-assembly or particle aggregation during the pigment crystallization step, so as to limit particle growth to predominantly nanoscale pigment particles. In embodiments, the stabilizer compound has a hydrocarbon moiety to provide sufficient steric bulk that enables the function of the stabilizer, wherein the hydrocarbon moiety is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

The sterically bulky stabilizer can have one or more functional groups that are capable of non-covalent bonding or association with a complementary functional moiety that is present on the pigment particles. Illustrative functional groups of the sterically bulky stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

Representative examples of stabilizer compounds for preparing nanoscale particles of monoazo laked pigments, that have both the pigment-affinic functional group which associates non-covalently (ionically) with the laked pigment in addition to suitably bulky hydrocarbon moiety, include (but are not limited to) the following compounds:

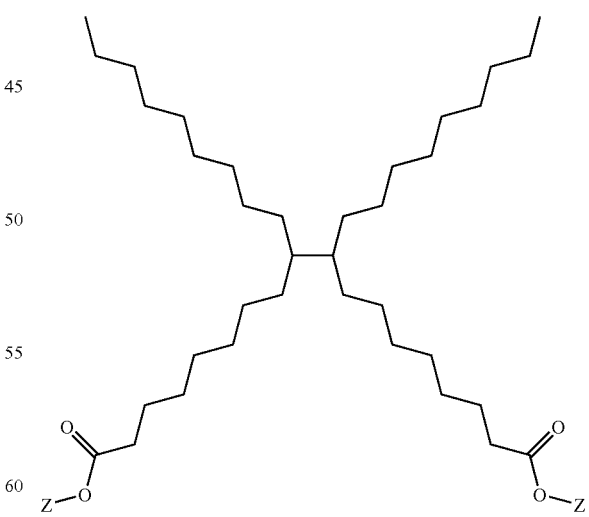

C36 Dimer Diacid

Z = H; Metal cations such as Na, K, Li, Ca, Ba, Sr, Mg, Mn, Al, Cu, B, and others; Organic cations such as $NH_4^+$, $NR_4^+$, $PR_4^+$, and others -continued

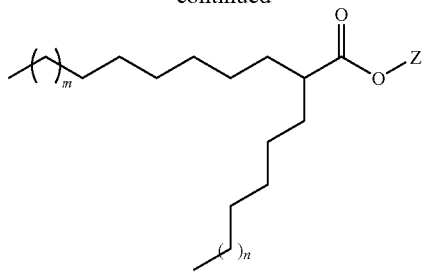

Z = H; Metal cations such as Na, K, Li, Ca, Ba, Sr, Mg, Mn, Al, Cu, B, and others; Organic cations such as $NH_4^+$, $NR_4^+$, $PR_4^+$, and others
and methylene units $(m + n) > 1$

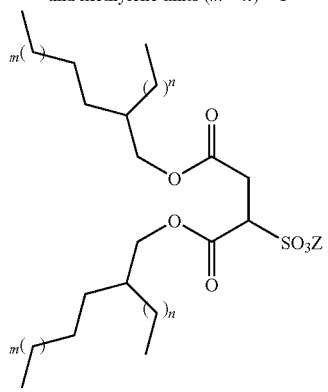

Z = H; Metal cations such as Na, K, Li, Ca, Ba, Sr, Mg, Mn, Al, Cu, B, and others; Organic cations such as $NH_4^+$, $NR_4^+$, $PR_4^+$, and others
and methylene units $(m + n) > 1$
per branch

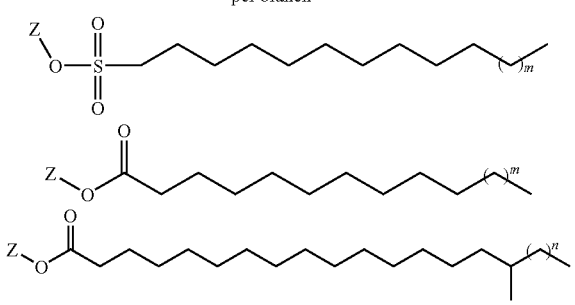

Z = H; Metal cations such as Na, K, Li, Ca, Ba, Sr, Mg, Mn, Al, Cu, B, and others; Organic cations such as NH4+, NR4+, PR4+, and others
and methylene units $m \geq 1$
and for iso-stearic acid, $n \leq 1$ wherein m and n denotes the number of repeated methylene units, and where m can range between 1 and 50, and n can range between 1 and 5, however the values can also be outside these ranges.

In additional embodiments, other compounds having different structures than those described previously may be used in addition to the bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such hydrocarbon alcohols, and the like. The types of non-covalent association that can occur between the functional moiety of the precursor/pigment and the complementary functional groups of these surface stabilizers are, for example, van der Waals' forces, ionic or coordination bonding, hydrogen bonding, and/or aromatic pi-stacking bonding, or combinations thereof. In the case of monoazo laked pigments, the predominant non-covalent bonding association is ionic bonding, but can include hydrogen bonding and aromatic pi-stacking bonding as additional or alternative types of non-covalent bonding between the functional moieties of these stabilizer compounds and the precursor/pigment.

The method of making nano-sized particles of the monoazo laked pigments such as those listed in Table 7 is a process that involves at least one or more reaction steps. A diazotization reaction is a key reaction step for synthesis of the monoazo laked pigment, whereby a suitable aniline precursor is either directly or indirectly converted first to a diazonium salt using standard procedures, such as procedures that include treatment with a diazotizing agent such as nitrous acid $HNO_2$ (for example, generated in situ by mixing sodium nitrite with dilute hydrochloric acid solution) or nitrosyl sulfuric acid (NSA), which is commercially available or prepared by mixing sodium nitrite in concentrated sulfuric acid. The resulting acidic mixture of diazonium salt is either a solution or a suspension and in embodiments is kept cold, to which can optionally be added an aqueous solution of the metal salt ($M^{n+}$) that will define the specific composition of the desired monoazo laked pigment product, such as those listed in Table 7. The diazonium salt solution or suspension is then transferred into a solution or suspension of a suitable coupling component that can be either acidic or basic in pH and generally contain additional buffers and surface active agents, including the sterically bulky stabilizer compounds such as those described earlier, to produce the desired organic pigment as predominantly nanoscale particles, which is obtained as a wetted colored solid in an aqueous slurry.

In embodiments is disclosed a two-step method of making nanosized monoazo laked red pigments, for example Pigment Red 57:1, wherein an advanced pigment precursor commonly known as Lithol Rubine is first synthesized as a potassium salt and appears as a water-soluble orange dye. The first step involves the diazotization of 2-amino-5-methyl-benzene-sulfonic acid by first dissolving the reactant in dilute aqueous potassium hydroxide solution (0.5 mol/L) and cooling to a temperature of about −5° C. to about 5° C., and then treating the solution with an aqueous solution of sodium nitrite (20 wt %), following with slow addition of concentrated hydrochloric acid at a rate that maintains the internal reaction temperature between −5° C. and +5° C. The resulting suspension that forms is stirred for additional time at cool temperature, so as to ensure completeness of diazotization, and then the suspension is carefully transferred to a second solution containing 3-hydroxy-2-naphthoic acid dissolved in dilute alkaline solution (0.5 mol/L potassium hydroxide) using vigorous agitation as the colorant product is produced in the aqueous slurry. After stirring for additional time of at least 1 hour at room temperature, the colorant product (potassium salt of Lithol Rubine) is isolated by filtration as an orange dyestuff and washed with deionized water to remove excess acid and salt by-products.

The second step of this process involves redispersing the orange dyestuff (Lithol Rubine-potassium salt) in deionized water to a concentration that can range from about 0.5 wt % to about 20 wt %, such as from about 1.5 wt % to about 10 wt % or from about 3.5 wt % to about 8 wt %, but the concentrations can also be outside of these ranges. The colorant solids in the slurry is then dissolved completely into liquid solution by treatment with aqueous alkaline base, such as sodium hydroxide or potassium hydroxide or ammonium hydroxide solution, until the pH level is high, such as above pH 8.0 or above pH 9.0 or above pH 10.0. To this alkaline solution of dissolved Lithol Rubine colorant can be optionally added a surface active agent such as those described earlier, in particular embodiments surface active agent such as rosin soaps, delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges.

In embodiments, the preparation of ultrafine and nanosized particles of the monoazo laked Pigment Red 57:1 was enabled by the additional use of a suitable steric stabilizer compound having branched hydrocarbons with either carboxylate or sulfonate functional groups, such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a polar, water-miscible co-solvent such as THF, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant. Lastly, the metal cation salt is added to transform the pigment precursor into the desired monoazo laked pigment (Pigment Red 57:1 in embodiments) as a precipitated pigment. In embodiments, an aqueous solution of calcium chloride with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess. The temperature during addition of the metal salt solution to cause precipitation of the pigment is also important. In embodiments, lower temperatures are desired, such as from about 10° C. to about 50° C., or from about 15° C. to about 35° C., but the temperature can also be outside of these ranges.

In embodiments, the slurry of nanoscale particles of organic monoazo laked pigment is next isolated by vacuum filtration through membrane filter cloth having average pore size of 0.45 micron or 0.8 micron diameter, and washed with deionized water to remove the excess of unwanted salts or surface additives that remain in solution and are not bound to the pigment particles. The pigment particles are then resuspended in a liquid solution containing a polymer-based encapsulant material, that will enable surface encapsulation or deposition of a shell layer onto the surface of the nanoscale pigment particles. The mode of non-covalent association between the functional groups of the polymer-based encapsulant material and the functional moieties of the monoazo pigment are predominantly ionic in nature, but can also include aromatic pi-stacking, van der Waals hydrophobic interactions, and hydrogen bonding as additional or alternative types of non-covalent bonding between the functional moieties of these polymer encapsulant and the pigment functional groups.

In embodiments, a preferred method for polymer encapsulation or deposition of a shell layer onto the surface of the nanoscale particles of organic monoazo laked pigment is the Layer-by-Layer technique. As described in *Langmuir*, 2000, 16, pp. 8932-36, the technique involves dispersing the organic pigment particles in an aqueous medium, treating with a first solution containing an ionic, amphiphilic polymer compound which deposits as a continuous thin layer onto the particle surface. Thereafter, the water-suspended organic pigment particles are treated with a second solution containing a different amphilic polymer compound that has opposite ionic charge to the first deposited ionic polymer. The alternating deposition of solutions of oppositely charged, ionic and amphiphilic polymer compounds results in a polymeric shell layer onto the pigment particle surface, which produces the polymer-encapsulation nanoscale particles of organic pigment. The thickness of the shell layer is determined by several factors, including the chemical structure of the two ionic, amphiphilic polymer compounds, the amount of each polymer compound that is loaded onto the pigment surface which is typically based on pigment mass and/or surface area, and the number of alternating depositions of the two ionic, amphiphilic polymer compounds.

In embodiments, the surface encapsulation of nanoscale particles of monoazo laked pigment is best achieved using amphiphilic polymer compounds, which are those that have ionic or ionizable functional groups (either positive or negative) with high ionic bonding affinity for the sulfonate and/or carboxylate functional moieties of the monoazo laked pigment, in addition to having hydrophobic functional groups that can act as a steric barrier or filler when deposited onto the pigment particle surface. Suitable examples of amphiphilic polymers having anionic and/or anionically ionizable functional groups include, but are not limited to, the following compounds: (meth)acrylic acid type polymers and copolymers such as poly(acrylic acid), poly(methacrylic acid), poly(alkyl acrylate-co-acrylic acid), poly(styrene-alkyl acrylate-acrylic acid), poly(styrene-butadiene-acrylic acid), poly(alkyl methacrylate-acrylic acid), poly(styrene-acrylonitrile-acrylic acid), poly(alkyl acrylate-acrylonitrile-acrylic acid), poly(styrene-butadiene-methacrylic acid), poly(styrene-butadiene-acrylonitrile-acrylic acid), poly(styrene-butyl acrylate-acrylic acid), poly(styrene-alkyl acrylate-methacrylic acid), poly(styrene-alkyl acrylate-beta-carboxy ethyl acrylate), sodium, potassium, lithium or ammonium salts of poly(4-styrene sulfonate), sodium, potassium, lithium or ammonium salts of poly(styrene-co-4-styrene sulfonate), sodium, potassium, lithium or ammonium salts of poly(styrene-butadiene-co-4-styrene sulfonate), poly(anetholesulfonic acid, sodium salt); sodium, potassium, lithium or ammonium salts of poly(4-styrenesulfonic acid-co-maleic acid), sodium, potassium, lithium or ammonium salts of poly(alkyl methacrylates-co-4-styrene sulfonate), sodium, potassium, lithium or ammonium salts of poly(styrene-alkyl acrylate-4-styrene sulfonate), and the like.

Suitable examples of amphiphilic polymers having cationic and/or cationically ionizable functional groups include, but are not limited to, the following compounds: 1) polymers and copolymers of vinyl pyridines, such as poly(4-vinyl pyridine), poly(2-vinyl pyridine), poly(styrene-4-vinyl pyridine), poly(styrene-2-vinyl pyridine), and the like; 2) polymers of vinyl pyrrolidones, such as poly(1-vinylpyrrolidinone), poly(4-vinylpyrrolidinone) and copolymers of vinyl pyrrolidinones made with (i) alpha-olefins such as 1-hexadecene, 1-octadecene, 1-eicosene, 1-triacontene and the like; (ii) substituted styrenes such as 4-methylstyrene, 4-chlorostyrene, 4-hydroxystyrene, 4-aminostyrene, 4-carboxyalkylstyrenes, and the like; (iii) substituted (meth)acrylates, such as diethylaminoethyl methacrylate, dimethyl aminoethyl methacrylate, monoethylaminoethyl methacrylate, t-butylaminoethyl methacrylate, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, dimethylaminopropyl acrylate, dimethylamino propyl methacrylate, dipropylaminoethyl acrylate, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-aminoethyl methacrylate, and the like; (iii) vinyl or allyl ethers, such as dimethylaminoethyl vinyl ether, diethylaminoethyl vinyl ether, aminoethyl vinyl ether, and the like; 3) polymers and copolymers of vinyl imidazoles, such as those disclosed, for example, in U.S. Pat. No. 5,773,545, the entire disclosure of which is incorporated herein by reference, and those prepared from 1-vinyl methylimidazole, 1-imidazolyl-para-methylstyrene, 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 4-ethyl-1-vinylimidazole, 4,5-dimethyl-1-vinylimidazole, 5-methyl-1-vinylimidazole, and 2,4,5-triethyl-1-vinylimidazole. Other suitable materials are disclosed in, for example, *J. Inorg. Chem.*, v. 17, pp. 283-91 (1982), the entire disclosure of which is incorporated herein by reference; 4) polymers and copolymers of diallyldialkyl ammonium halides, such as poly(diallyldimethyl ammonium chloride), poly(diallydiethyl ammonium chloride), and the like; 5) polymers and copolymers of dialkylaminoethyl(meth)acrylates, such as poly(N,N-dimethylaminoethyl methacrylate), poly(vinylpyrrolidinone-co-N,N-dimethylaminoethyl methacrylate), and the like; 6) polyesters terminated with ammonium salts, such as tetramethylammonium poly(12-hydroxystearic acid) terminated with acid end-groups, ammonium salts of amide-terminated polyesters, such as tetramethylammonium salt of 2-aminoethyl-amido terminated poly(12-hydroxystearic acid), and other tetraalkylammonium salts of such amide-terminated polyesters, such as is found in selected SOLSPERSE® dispersant polymers (available from Lubrizol corporation); 7) polyamides terminated with ammonium salts, such as poly(alkylenediamine-co-alkanedioic acid) with tetramethylammonium salt end groups; and ammonium salts of acid-terminated polyamides, such as the tetraalkylammonium salts of poly(alkylenediamine-co-alkanedioic acid) and poly(alkylenoxydiamine-co-alkanedioic acid) and the like; 8) polymers containing heterocyclic monomer groups, such as polyesters, polyamides, polyethyleneoxides that have terminal grafted heterocyclic functional groups, including heterocycles containing at least one nitrogen and/or one oxygen and/or one sulfur atom; examples of such heterocyclic functional groups include, but are not limited to, pyridinyl, pyrrolyl, pyrrolidinyl, piperidinyl, piperazinyl, pyrazolyl, imidazolyl, benzimidazolyl, imidazolinonyl, benzimidazolinonyl, oxazolinyl, oxazolyl, oxazolidinonyl, benzoxazolinyl, triazinyl, indolyl, indenyl, benzindenyl, indenonyl, benzindenonyl, carbazolyl, thiazolyl, thiazolinyl, pyridinonyl, pyrimidinyl, pyrimidinonyl, picolinyl, acridonyl, benzacridonyl, quinacridonyl, ureido-substituted and alkylcarbamoyl-substituted heterocycles such as ureidopyrimidinones, ureidopyridinones and ureidotriazines, and the like; and 9) oligomers and polymers that contain a succinimide or phthalimide functional group, such as polyisobutylene succinimides or alkylene succinimides wherein the alkylene group contains from 4 to about 20 carbons and the succinimide nitrogen atom is substituted with an alkyl group, alkylaryl group, or aryl groups containing from 1 to about 20 carbons.

In embodiments, when alternately depositing a surface layer of cationic and anionic amphiphilic polymer, in order to achieve the polymeric encapsulation of the nanoscale organic pigment particles, the solutions of the ionic polymer are typically prepared by dissolution in a liquid such as water or polar organic solvent, or in water with the addition of a water-miscible solvent. The concentration of the ionic polymer in such a liquid can range from about 0.1 wt % to about 80 wt %, or 0.5 wt % to about 50 wt %, or preferably from about 1 wt % to about 25 wt %, although the actual concentration can be anywhere outside this range. In certain cases, the dissolution or dispersion of the ionic polymer in water as the only liquid medium may be preferable at a temperature higher than room temperature, such as from about 20° C. to about 80° C., or to about 50° C., or to about 35° C. The total amount of ionic polymers to be deposited as a shell encapsulating layer on the nanoparticle surface is dependent on both the chemical composition of the polymers, the degree of branching (non-linearity), the degree of ionic or ionizable functional groups, and the molecular weight. The preferred molecular weights of such polymers can range from about 1000 g/mol to about 500,000 g/mol, or from about 3000 g/mol to about 300,000 g/mol, or from about 5000 g/mol to about 100,000 g/mol, although the actual molecular weight values for any desirable ionic polymer can be outside of this range.

In embodiments that use of a copolymer with organic pigment-affinic groups, including the ionic, amphiphilic polymers, it preferred to use copolymers that have anywhere from 1 mol % to about 75 mol % of monomers having pigment-affinic, ionic or ionizable groups, or from about 1 mol % to about 50 mol %, or preferably up to about 30 mol % of monomers having pigment-affinic, ionic or ionizable groups, although the actual content can be anywhere outside this range.

Additionally, other suitable minor organic pigment-affinic monomer units include but are not limited to acrylamide, methacrylamide, N-methylacrylamide, N,N'-dimethyl acrylamide, N-methyl methacrylamide, polyvinyl alcohol, polyvinyl acetate, poly vinyl acetal, poly vinyl butyral, methyl vinyl ether, p-aminostyrene, o-aminostyrene, diethylaminoethyl acrylate, piperidinoethyl acrylate, piperidinoethyl methacrylate, morpholinoethyl acrylate, morpholinoethyl methacrylate, 2-pyrrolidinoethyl methacrylate, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 3-dimethylaminoethyl)-2-hydroxypropyl acrylate, 3-(dimethylaminoethyl)-2-hydroxypropyl methacrylate, 2-aminoethyl acrylate, 2-aminoethyl methacrylate, and mixtures thereof. Other suitable materials are disclosed in, for example, *J. Inorg. Chem.*, v. 17, pp. 283-91 (1982), the entire disclosure of which is incorporated herein by reference.

Examples of suitable non-pigment affinic monomer units include acrylate-based monomers and styrene-based monomers. Specific examples of such non-organic pigment-affinic monomer units include but are not limited to styrene, methylstyrene, ethylstyrene, chlorostyrene, hydroxystyrene, methoxystyrene, norbornene, itaconic acid, 1-alkenes (alpha-olefins) such as 1-eicosene, 1-octadecene, 1-hexadecene, 1-dodecene, 1-decene, 1-octene, and the like, alkyl acrylates, aryl acrylates, alkyl methacrylates, aryl methacrylates, 1,3-butadiene, isoprene, acrylic acid, methacrylic acid), acrylonitrile, substituted succinic anhydrides such as polyisobutylene succinic anhydride, and the like. Mixtures of two or more of monomers can also be used, if desired.

The organic pigment-affinic monomer units and non-pigment-affinic monomer units can be assembled in a copolymer in any desired manner, such as for example a random copolymer, block copolymer, alternating copolymer or grafted copolymer. A variety of molecular structures can be selected for such copolymers, including linear, branched or grafted, hyperbranched, dendritic, star-shaped, and others. When such copolymers are dissolved in a suitable solvent for ease of use, and then mixed with a non-solvent, or, liquid in which the copolymer has poor solubility, a variety of 3-dimensional macromolecular architectures can be adopted by such copolymers. Examples of such macromolecular architectures include, but are not limited to, spheroidal micelles, ellipsoidal micelles, cylindrical micelles or tubules, gyroids, lamellar planes or networks, and others. It is preferable that the process conditions for polymer encapsulation of the nanoscale pigment particle surface be chosen such that the pigment particle's inherent morphology serves to template the deposition (encapsulation) by the polymer. This arrangement enables nanoscopically thin layers of polymer to coat and encapsulate the pigment nanoparticle surface and still retain the nascent morphology of the nanoparticle. The desired thickness of the polymer encapsulating shell layer is generally less than about 100 nm, such as less than about 75 nm, or less than about 50 nm, in order to provide an optically transparent coating of the pigment nanoparticle and not obscure the coloristic or spectral properties of the organic pigment. In embodiments, the polymer encapsulating shell layer is predominantly a continuous deposit of polymer materials, part of which contains pigment-affinic charge neutral, ionic and/or ionizable functional groups.

The separate organic pigment-affinic monomer units and non-organic pigment-affinic monomer units can otherwise be assembled into a copolymer according to polymerization and chemical grafting methods that are well known in the art. Thus, these methods are not further described herein.

The nanoscale pigment particles, when properly synthesized using the exemplary conditions and steric stabilizers outlined in the embodiments, were desirably ultrafine in particle size. For example, the material desirably has an average particle size of less than about 150 nm, such as about 10 nm to about 25, about 50, about 75, or about 100 nm. In embodiments, the nanosized pigment particles that were obtained for monoazo laked pigments can range in average particle size, $d_{50}$, or average particle diameter as measured by TEM imaging, from about 10 nm to about 200 nm, such as from about 25 nm to about 150 nm, or from about 50 nm to about 125 nm. In embodiments, the particle size distributions can range such that the geometric standard deviation can range from about 1.1 to about 1.9, or from about 1.2 to about 1.7, as measured by dynamic light scattering method. The shape of the nanosized pigment particles can be one or more of several morphologies, including rods, platelets, needles, prisms, ellipsoidal or spherical, and the aspect ratio of the nanosize pigment particles can range from 1:1 to about 10:1, such as having the [length:width] aspect ratio between 1:1 and 7:1, or more preferably between 1:1 and 5:1; however the actual metric can lie outside of these ranges.

Nanoscale particles of any desired class of organic pigment can potentially be used for preparation of polymer-encapsulated nanoscale pigments, however in embodiments, the preferred organic pigments are those whose structures contain a polar functional moiety that contains one or more heteroatoms selected from N, O, or S. In the case of using a layer-by-layer approach for depositing polymers having ionic or ionizable functional groups, organic pigments having an ionic or ionizable functional moiety, such as carboxylic acid/carboxylate, sulfonic acid/sulfonate, amino/ammonium/imine/iminium, hydroxyl/phenolic/enol groups, and the like, are easiest to use as the core nanoparticle for the encapsulation. Examples of such organic pigment classes include, but are not limited to, quinacridone family of pigments such as 2,9-dimethylquinacridone such as Pigment Red 122, 2,9-dichloroquinacridone such as Pigment Red 202, unsubstituted quinacridones such as Pigment Violet 19, among others; members of the monoazo and disazo classes of pigments such as Pigment Red 269, Pigment Yellow 155, Pigment Yellow 74, among others; monoazo-laked pigments such as Pigment Red 57:1, Pigment Red 48:2; rhodamine-laked pigments such as Pigment Red 81:2 and Red 81:3, azo-benzimidazolone pigments such as Pigment Red 185, Pigment Red 208, Pigment Red 176, Pigment Yellow 151, Pigment Yellow 180, Pigment Yellow 154, among others; diarylide pigments such as Pigment Yellow 17 and Pigment Yellow 83; phthalocyanine-type pigments such as Pigment Blue 15:3 or 15:4 copper phthalocyanine, among others; or mixtures thereof.

In embodiments, these nanoscale-sized pigments can be dispersed in a variety of media where such high specular reflectance is afforded. Polymeric particle dispersants (pigment dispersants) that aid in the dispersion and coating ability of nanoscale pigments include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, vinyl pyrrolidinone, polyester copolymers, polyamide copolymers, and copolymers of acetals. Other examples of polymeric dispersants include, but are not limited to, poly(vinyl butyral-co-vinyl alcohol-co-vinyl acetate), poly(vinyl acetate), poly (acrylic acid), poly(methacrylic acid), poly(vinyl alcohol), poly(N-vinylcarbazole), poly(methyl methacrylate), polyvinylidene difluoride, polyesters such as MOR-ESTER 49000®, polycarbonate polymers such as Lexan®, and Merlon® M-39, and poly(2-hydroxyethyl methacrylate), poly (styrene-b-4-vinylpyridine), polyurethane resins, polyarylether ketones, polyesters and polyamides that are functionalized with large aliphatic groups or alkyl polymers, such as the Solsperse® dispersants, N-alkylated substituted succinimides such as Ircosperse®, phenol-formaldehyde resins, polyols or polyethyleneoxides such as Pluronic® and Pluronic® R polymers, polysulfones, polyarylethers, polyarylsulfones, and the like. Suitable mixtures of at least two polymers can also be used to disperse nanoscale-sized pigments in liquid media. Many available commercial dispersants, such as those from BYK-Chemie, Efka Additives, and Lubrizol, are particularly well-suited to disperse many organic pigments in a variety of liquid media.

If desired, the surface layer of the encapsulating material can be crosslinked, coated, or otherwise modified so as to provide, for example, desirable dispersion properties, structural rigidity, thermal stability, and the like.

The shell can be made more rigid, for example, by crosslinking the polymer chains. For example, the non-pigment-affinic monomer units of one copolymer can be crosslinked with another to form a more rigid encapsulated shell layer that is templated onto the nanoscale particle of organic pigments. In embodiments, different methods, known in the art, can be used for crosslinking the polymer chains, depending upon different desired surface properties. For example, different crosslinking methods can be used to provide a hydrophobic encapsulating material surface or to provide a hydrophilic encapsulating material surface. Suitable methods are described, for example, in K. L. Wooley; *J. Polym. Sci. A,* 38, p. 1397 (2000), the entire disclosure of which is incorporated herein by reference.

An optional further step, which can be conducted in embodiments, is to reinforce and further rigidify the encapsulated nanoscale particles of organic pigments to further maintain architectural integrity of the encapsulating material and provide improved thermal stability under high temperatures (such as up to about 120° C. or higher). This reinforcement can be achieved, for example, by controlled deposition of condensed silica or titania or mixtures of both on the surface of the nanoparticles. For example, silica can be deposited on the surface of the encapsulating material by using sol-gel polymerization method with silica precursor reagents such as alkoxysilanes, for example tetramethoxysilane (TMOS), tetraethoxysilane (TEOS), tetra-n-propoxysilane, and the like. Techniques for localized silica deposition have been demonstrated with a great degree of control to provide well-defined hybrid copolymer-silica particles of less than 50 nm in diameter, with minimal formation of non-templated silica particles. See, for example, J-J. Yuan, et al., *J. Am. Chem. Soc.,* p. 129, 1717 (2007), the entire disclosure of which is totally incorporated herein by reference.

The encapsulating material that covers the enclosed organic pigment is desirable completely or substantially transparent. In this way, the coloristic properties provided by the organic pigment are not blocked, masked, or deteriorated by the presence of the encapsulating material and any optional surface treatment procedures.

The advantages of this composition and process include the ability to tune the pigment particle surface composition, while maintaining the approximate particle size and morphology of the core nanoscale organic pigment particle, for the intended end-use application, such as toners and inks and coatings, which include phase-change, gel-based and radiation-curable inks, solid and non-polar liquid inks, solvent-based inks, lithographic inks, and aqueous inks and ink dispersions. For the end-use application in piezoelectric inkjet printing, nanoscale pigment particles are advantageous to ensure reliable inkjet printing and prevent blockage of jets due to pigment particle agglomeration. In addition, nanoscale pigment particles are advantageous for offering enhanced color properties in printed images.

The formed encapsulated nanoscale particles of organic pigments can be used, for example, as coloring agents in a variety of compositions, such as in liquid (aqueous or non-aqueous) ink vehicles, including inks used in conventional pens, markers, and the like, liquid ink jet ink compositions, solid or phase change ink compositions, and the like. For example, the encapsulated nanoscale particles of organic pigments can be formulated into a variety of ink vehicles, including "low energy" solid inks with melt temperatures of about 60 to about 130° C., solvent-based liquid inks or radiation-curable inks and toners, such as UV-curable liquid inks comprised of alkyloxylated monomers, and even aqueous inks including UV-curable aqueous inks. Also, the encapsulated nanoscale particles of organic pigments are especially useful as coloring agents in various non-polar inkjet ink matrices such as hydrocarbon oils, and wax-based solid inks. In addition, the formed encapsulated nanoscale particles of organic pigments can be used in other applications, such as cosmetics, and the like.

Another benefit of the encapsulated nanoscale particles of organic pigments of the disclosure is that the polymer encapsulation process enables the passivation of the surface chemical properties and surface charge (or lack thereof) of ordinary pigment particles. This is particularly true of nanoscale particles of organic pigments, since they have very high surface areas and as a result, have a particularly high affinity or propensity for inter-particle aggregation (i.e. self-assembly of particles), which in turn causes enormous challenges for dispersions such untreated particles in a matrix. The present disclosure provides a potential solution to the dispersion challenges of nanoscale organic pigment particles, by providing a composition and process for making polymer-encapsulated nanoscale pigment particles having regular particle size and morphology and with uniform surface structure, and to aid particle dispersability and thermal stability in difficult matrices such as non-polar liquids, waxes, and solid inks.

EXAMPLES

Example 1

Preparation of Polymer-Encapsulated Nanoscale Particles of Quinacridone Pigment Red 122

Step 1; Preparation of the Nanoscale Pigment Red 122 Particles

In a 2 L vessel fitted with a mechanical agitator (Heidolph mixer), condenser, and temperature probe, is charged 750 g of concentrated (96-98%) sulfuric acid. The agitator is started, after which is charged into the acid about 1.5 g (3 wt %) of KE-100 Pine Crystal (from Arakawa Chemical Industries), followed by addition of 50 g of Pigment Red 122 (obtained from Dainichiseika) over 30 minutes. The mixture is heated to 50° C. in 30 minutes under inert atmosphere conditions, and then kept at 50° C. for 3 hours to fully dissolve the pigment. In a separate 6 L reactor vessel equipped with mechanical agitator using a P4 stirrer blade, condenser and temperature probe is charged 1200 g de-ionized water, and then cooled to 5° C. while stirring. Once the 3 hour pigment dissolution time was completed in the 2 L reactor, the acidic solution of pigment and surface agent is added to the cooled de-ionized water very slowly over a period of 90 minutes while maintaining the temperature between 5-10° C. and under vigorous agitation, which causes reprecipitation of the pigment as nanoparticles. The quenched mixture is then neutralized by the dropwise addition of 1000 g of 26-30% aqueous ammonia solution over a period of 90 minutes, while maintaining the reaction temperature at 5-15° C. during the neutralization. The pigment is filtered and concentrated using a Crossflow filtration unit fitted with a 0.5 micron ceramic filter element. The concentrated pigment slurry undergoes repeated washing/concentration with fresh de-ionized water, using the Crossflow unit, until the filtrate pH1 is about 8. The concentrated pigment slurry is then transferred into a 2 L vessel equipped with mechanical agitator and temperature probe, and is stirred gently while diluting to about 300 mL of deionized water in the slurry (about 7-10 wt % pigment solids). At this stage, pigment slurry is either prepared for polymer encapsulation as described in Step 2 below, or is alternatively vacuum-oven dried at 50° C. If the latter, then the dried pigment is de-lumped in a coffee grinder, to yield about 39 g of magenta pigment. HR-TEM microscopy images show short rectangular prism-like particles having lengths of about 30-70 nm, widths of about 20-30 nm, and depths of about 15-30 nm. Typical [length:width] aspect ratios measured with these pigment nanoparticles are less than about 5, and often less than about 3. Crystal lattice d-spacings of the nanoscale pigment indicate that the beta-quinacridone polymorph of PR 122 is produced by this method.

Step 2: Polymer-Encapsulation of the Nanoscale Pigment Red 122 Particles Using Layer-By-Layer Technique As described above, the concentrated pigment slurry from the Crossflow unit is then transferred into a 2 L vessel equipped with mechanical agitator and temperature probe, and is stirred gently while diluting to about 300 mL of deionized water in the slurry (about 7-10 wt % pigment solids). An aqueous solution containing 5 wt % of sodium poly(4-styrenesulfonate), PSS, obtained from Sigma-Aldrich (Milwaukee, Wis.) of MW of 70,000 g/mol, is prepared, and about 50 mL of the solution (or, about 5 wt % loading based on pigment mass) is slowly added to the pigment slurry while stirring at high speed, about 350 rpm. The mixture is stirred at room temperature for 1 hour, then vacuum-filtered through Versapor®-450 membrane filter cloth (available from Pall Corp., Ontario, CANADA) and rinsing with two 100 mL aliquots of deionized water. The pigment cake is redispersed with stirring into 300 mL of deionized water and then is treated with about 125 ml of an aqueous solution containing 2 wt % of poly(1-vinyl pyrrolidinone-co-N,N-dimethylaminoethyl methacrylate), PVP-DMEMA obtained from Sigma-Aldrich (Milwaukee, Wis.), which is about 5 wt % loading based on pigment mass. The dropwise addition of this cationic polymer solution is carried over 1 hour while at room temperature and using vigorous agitation, in order to prevent coagulation of the pigment nanoparticles. Once the addition is complete, the mixture is stirred for an additional 1 hour, then vacuum-filtered using the membrane filter cloth, and rinsing with two 100 mL aliquots of deionized water, or until the conductivity of the rinse filtrates is below 200 µS/cm. These procedures could optionally be repeated for depositing a third layer from the 5 wt % PSS aqueous solution, and a optional fourth layer using the 2 wt % PVP-DMEMA aqueous solution, depending on the end use of such encapsulated pigment nanoparticles. The isolation of the polymer encapsulated pigment particles is performed by vacuum filtration using Versapor®-450 membrane filter cloth, and the wet cake is rinsed with two 100 mL aliquots of deionized water, or until the conductivity of the rinse filtrates was below 200 µS/cm. The wetted pigment is then reslurried into 150 mL water and freeze-dried over 2 days, affording about 35 grams of dry, fine magenta powder.

Example 2

Preparation of Polymer-Encapsulated Nanoscale Particles of Quinacridone Pigment Red 122 in One Process In a 2 L vessel fitted with a mechanical agitator (Heidolph mixer), condenser, and temperature probe, is charged 750 g of concentrated (96-98%) sulfuric acid. The agitator is started, after which is charged into the acid about 1.5 g (3 wt %) of KE-100 Pine Crystal (from Arakawa Chemical Industries), followed by addition of 50 g of Pigment Red 122 (obtained from Dainichiseika) over 30 minutes. The mixture is heated to 50° C. in 30 minutes under inert atmosphere conditions, and then kept at 50° C. for 3 hours to fully dissolve the pigment. In a separate 6 L reactor vessel equipped with mechanical agitator using a P4 stirrer blade, condenser and temperature probe is charged 1200 g de-ionized water and 25 g of sodium poly(4-styrenesulfonate), PSS, obtained from Sigma-Aldrich (Milwaukee, Wis.) of MW of 70,000 g/mol, and the solution cooled to 5° C. while stirring. Once the 3 hour pigment dissolution time was completed in the 2 L reactor, the acidic solution of pigment and surface agent is added to the cooled solution of PSS in de-ionized water very slowly over a period of 90 minutes while maintaining the temperature between 5-10° C. and under vigorous agitation, which causes reprecipitation of the pigment as nanoparticles. The quenched mixture is then neutralized by the dropwise addition of 1000 g of 26-30% aqueous ammonia solution over a period of 90 minutes, while maintaining the reaction temperature at 5-15° C. during the neutralization.

The pigment is filtered and concentrated using a Crossflow filtration unit fitted with a 0.5 micron ceramic filter element. The concentrated pigment slurry undergoes repeated washing/concentration with fresh de-ionized water using the Crossflow unit, until the filtrate pH is about 8. The concentrated pigment slurry is then transferred into a 2 L vessel equipped with mechanical agitator and temperature probe, and is stirred gently while diluting to about 300 mL of deionized water in the slurry. The pigment slurry is then treated with about 125 ml of an aqueous solution containing 2 wt % of poly(1-vinyl pyrrolidinone-co-N,N-dimethylaminoethyl methacrylate), PVP-DMEMA obtained from Sigma-Aldrich (Milwaukee, Wis.), which is about 5 wt % loading based on pigment mass. The dropwise addition of this cationic polymer solution is carried over 1 hour while at room temperature and using vigorous agitation. Once the addition is complete, the mixture is stirred for an additional 1 hour, then vacuum-filtered using the membrane filter cloth, and rinsing with two 100 mL aliquots of deionized water, or until the conductivity of the rinse filtrates is below 200 µS/cm. A final deposition of polymer is made by treatment with 30 mL of an aqueous solution containing 5 wt % of sodium poly(4-styrenesulfonate), PSS, (about 3 wt % loading based on pigment mass) which is slowly added to the pigment slurry while stirring at high speed, about 350 rpm. The mixture is stirred at room temperature for another hour, then vacuum-filtered through Versapor®-450 membrane filter cloth (available from Pall Corp., Ontario, CANADA) and rinsing with two 100 mL aliquots of deionized water, or until the conductivity of the rinse filtrates is below 200 µS/cm.

The polymer encapsulated pigment particles are recovered by vacuum filtration using Versapor®-450 membrane filter cloth, and the wet cake is rinsed with two 100 mL aliquots of deionized water, or until the conductivity of the rinse filtrates was below 200 µS/cm. The wetted pigment is then reslurried into 150 mL water and freeze-dried over 2 days, affording about 38 grams of dry, fine magenta powder.

Example 3

Synthesis of Nanoscale Particles of Pigment Red 57:1

Step 1: Diazotization and Coupling:

Into a 500 mL round bottom flask equipped with a mechanical stirrer, thermometer, and addition funnel is dissolved 2-amino-5-methylbenzenesulfonic acid (12.15 g) into 0.5M KOH aqueous solution (135 mL). The solution is cooled to 0° C. A 20 wt % aqueous solution of sodium nitrite ($NaNO_2$; 4.52 g dissolved into 30 mL water) is added slowly to the first solution while maintaining the temperature below 0° C. Concentrated HCl (19.5 mL) is slowly added dropwise over 1 hour while maintaining the internal temperature below 0° C. The mixture forms a pale brown suspension and is subsequently stirred an additional 0.5 hour.

In a separate 2-L resin kettle is dissolved 3-hydroxy-2-naphthoic acid (12.2 g) into an aqueous solution of KOH (12.0 g) in water (130 mL). An additional 350 mL of water is added, and the solution was then cooled to about 15° C. while stirring. The cold suspension of the diazonium salt solution is then added slowly to the coupling solution while mixing vigorously. The color change is immediate to a dark red solution, and ultimately to a yellowish-red (orange) slurry of precipitated dyestuff. The mixture is stirred for 2 hours while warming up to room temp, then is vacuum-filtered and reslurried into about 600 mL of deionized water. The resulting orange slurry is herein referred to as "Lithol Rubine-Potassium salt dyestuff" and has a solids content of about 3.75%-wt.

Step 2; Laking Step to Produced Nanoscale Particles of Pigment Red 57:1

Into a 1-L resin kettle equipped with mechanical stirrer and condenser is charged 265 g of aqueous slurry of "Lithol Rubine-Potassium salt dyestuff" prepared from Step 1 of Example 3, having approximately 3.75%-wt solids content. The pH of the slurry is first adjusted to about 9.0 or higher by addition of 0.5 M KOH solution, which causes complete dissolution of the dyestuff. An aqueous solution 5 wt % Dresinate X rosin-type surfactant (20.0 mL), obtained from Hercules Corp., is added to the mixture followed by the addition of a solution containing a sterically bulky surface additive, 4.8 g of sodium dioctyl sulfosuccinate obtained from Sigma-Aldrich (Milwaukee, Wis.) dissolved in 220 mL of 90:10 deionized water/THF. Lastly, an aqueous solution of calcium chloride dihydrate (0.5 M solution, 65 mL) is added dropwise to the slurry while stirring vigorously. A red precipitate forms immediately, and after complete addition of the calcium chloride solution, the red slurry is stirred for an additional 1 hour. The pigment slurry is then heated to about 60° C. for 30 min, and cooled immediately after in a cold bath. The pigment nanoparticles are then vacuum-filtered under high vacuum through a Versapor®-450 membrane filter cloth (obtained from PALL Corp., Mississauga, CANADA), then rinsed with two 200 mL portions of deionized water, until the filtrate pH is less than about 7.5 and the conductivity is lower than 200 µS/cm, so as to remove excess salts. At this stage, the wet nanopigment cake is reslurried into about 200 mL of deionized water and is either prepared for polymer encapsulation treatment as described in Example 4, or is freeze-dried for 48 hours, affording a dark red-colored powder (12.75 grams). Transmission electron microscopy images of the powder show predominantly platelet-like particles with particle diameters ranging from 50-150 nm, and aspect ratios that were equal to or less than about 3:1

Example 4

Encapsulation of Nanoscale Particles of Pigment Red 57:1 Using Ionic, Amphiphilic Polymer and Layer-By-Layer Technique The wet nanopigment cake prepared as described above in Example 3 is reslurried into about 200 mL of deionized water and either prepared for polymer encapsulation treatment. About 13 mL of aqueous solution containing 5 wt % of sodium poly(4-styrenesulfonate), PSS, obtained from Sigma-Aldrich (Milwaukee, Wis.) of MW of 70,000 g/mol (or, about 5 wt % loading based on pigment mass) is slowly added over 1 hour to the pigment slurry while stirring at high speed, about 350 rpm. The mixture is stirred at room temperature for another 1 hour, then vacuum-filtered through Versapor®-450 membrane filter cloth (available from Pall Corp., Ontario, CANADA) and rinsing with two 50 mL aliquots of deionized water. The pigment cake is redispersed with stirring into 200 mL of deionized water and then is treated with about 25 ml of an aqueous solution containing 2 wt % of poly(1-vinyl pyrrolidinone-co-N,N-dimethylaminoethyl methacrylate), PVP-DMEMA obtained from Sigma-Aldrich (Milwaukee, Wis.), which is about 4 wt % loading based on pigment mass. The dropwise addition of this cationic polymer solution is carried over 1 hour while at room temperature and using vigorous agitation, in order to prevent coagulation of the pigment nanoparticles. Once the addition is complete, the mixture is stirred for an additional 1 hour, then vacuum-filtered using the membrane filter cloth, and rinsing with two 50 mL aliquots of deionized water, or until the conductivity of the rinse filtrates is below 200 µS/cm. These procedures could optionally be repeated for depositing a third layer from the 5 wt % PSS aqueous solution, and an optional fourth layer using the 2 wt % PVP-DMEMA aqueous solution, depending on the end use of such encapsulated pigment nanoparticles. The wetted pigment is recovered by redispersing into 200 mL water and is then freeze-dried over 2 days, affording about 12 grams of dry red powder.

It will be appreciated that various of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. Encapsulated nanoscale particles of organic pigments, comprising:
   a polymer-based encapsulating material, and
   one or more nanoscale organic pigment particles encapsulated by the polymer-based encapsulating material,
   wherein the nanoscale organic pigment particles comprise an organic pigment having at least one functional moiety and a surface-associated sterically bulky stabilizer compound having at least one functional group, wherein the functional moiety of the pigment associates non-covalently with the functional group of the stabilizer,
   the encapsulated nanoscale particles have an average particle diameter as measured by TEM imaging of from about 10 nm to about 200 nm, and
   the sterically bulky stabilizer is represented by the following structure:

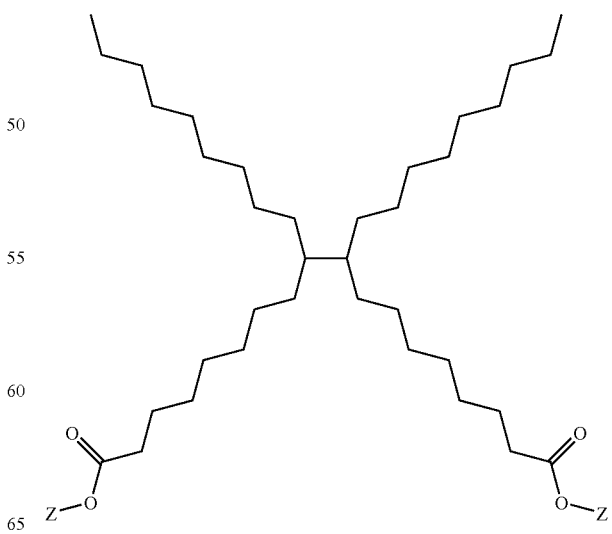

wherein Z is H, a metal cation, or an organic cation.

2. The encapsulated nanoscale particles of claim 1, wherein the polymer-based encapsulating material is a homopolymer or a copolymer.

3. The encapsulated nanoscale particles of claim 1, wherein the polymer-based encapsulating material is a copolymer comprising a minor number of organic pigment-affinic monomer units, and a major number of non-organic pigment-affinic monomer units.

4. The encapsulated nanoscale particles of claim 3, wherein the organic pigment-affinic monomer units are selected from the group consisting of heterocycles containing at least one nitrogen and/or one oxygen, carboxylic acid, amide, or ester derivatives, alkanesulfonates or arenesulfonates, substituted or unsubstituted ammonium salts of a carboxylate, sulfonate, or halide ion, and other aromatic carbocycles or heterocycles having a binding affinity to organic pigments.

5. The encapsulated nanoscale particles of claim 3, wherein the organic pigment-affinic monomer units are one or more selected from the group consisting of:
   (a) alkyl-1-vinylimidazoles, where the alkyl group is from 1 to about 24 carbon atoms,
   (b) ethylenically unsaturated amides, N-alkyl alkenamides or N,N-dialkyl alkenamides where the alkyl group is from 1 to about 6 carbon atoms,
   (c) an alkenyl pyrrolidone where the alkenyl group has from 1 to about 6 carbon atoms,
   (d) an alkenyl pyridine where the alkenyl group has from 1 to about 6 carbon atoms,
   (e) a polymer made with a monomer comprising a heterocycle group that contains at least one nitrogen and/or one oxygen and/or one sulfur atom; and
   (f) an oligomer or polymer that contain one or more succinimide or phthalimide functional groups.

6. The encapsulated nanoscale particles of claim 3, wherein the organic pigment-affinic monomer units are one or more selected from the group consisting of: substituted styrenes, substituted (meth)acrylates, vinyl or allyl ethers, alkenyl imidazoles, dialkenyldialkyl ammonium halides, alkylenediamines, alkanedioic acids, alkylarenedioic acids, alkenylamides, polyvinyl alcohol, polyvinyl acetate, poly vinyl acetal, poly vinyl butyral, alkenyl ethers and alkenyl sulfides, and combinations thereof.

7. The encapsulated nanoscale particles of claim 3, wherein the non-organic pigment-affinic monomer units are selected from the group consisting of acrylate-based monomers and styrene-based monomers, including styrene, methylstyrene, ethylstyrene, chlorostyrene, hydroxystyrene, methoxystyrene, norbornene, itaconic acid, 1 alkenes (alpha-olefins) such as 1-eicosene, 1-octadecene, 1-hexadecene, 1-dodecene, 1-decene, 1-octene, and the like, alkyl acrylates, aryl acrylates, alkyl methacrylates, aryl methacrylates, 1,3-butadiene, isoprene, acrylic acid, methacrylic acid), acrylonitrile, substituted succinic anhydrides such as polyisobutylene succinic anhydride, and combinations thereof.

8. The encapsulated nanoscale particles of claim 3, wherein the organic pigment-affinic monomer units and non-organic pigment-affinic monomer units can be assembled as a copolymer, including a random copolymer, block copolymer, alternating copolymer or grafted copolymer, and wherein said copolymer can be linear, branched, grafted, hyper-branched, star-shaped or dendritic.

9. The encapsulated nanoscale particles of claim 3, wherein a content of organic pigment-affinic monomer units is from about 1 mol % to about 75 mol % of total monomer content, and from about 1 mol % to about 50 mol % of total monomer content in the polymer encapsulating material.

10. The encapsulated nanoscale particles of claim 1, wherein the thickness of the polymer encapsulating shell layer is less than about 100 nm and provides an optically transparent coating of the pigment nanoparticle.

11. The encapsulated nanoscale particles of claim 1, wherein the particles can have one or more of several different morphologies, and wherein an aspect ratio of the nanoscale particles can range from 1:1 to about 10:1.

12. The encapsulated nanoscale particles of claim 1, wherein the polymer-based encapsulating material further comprises a reinforcement agent deposited thereon.

13. The encapsulated nanoscale particles of claim 1, wherein the encapsulating layer material is deposited onto the pigment particle surface using layer-by-layer technique with polymers having one or more ionic and/or ionizable functional groups.

14. The encapsulated nanoscale particles of claim 1, wherein the organic pigment is a quinacridone pigment.

15. The encapsulated nanoscale particles of claim 1, wherein the organic pigment is an organic monoazo laked pigment and the at least one functional moiety is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl(thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

16. The encapsulated nanoscale particles of claim 1, wherein the encapsulated nanoscale particles have an average particle diameter as measured by TEM imaging of from about 25 nm to about 150 nm.

17. The encapsulated nanoscale particles of claim 1, wherein the encapsulated nanoscale particles have an average particle diameter as measured by TEM imaging of from about 50 nm to about 125 nm.

18. The encapsulated nanoscale particles of claim 1, wherein the sterically bulky stabilizer has a function of controlling an extent of molecular self-assembly or particle aggregation during pigment crystallization before the nanoscale organic pigment particles are encapsulated by the polymer-based encapsulating material.

19. The encapsulated nanoscale particles of claim 1, wherein the encapsulated nanoscale particles are prepared by a process comprising:
   providing an organic pigment precursor to a monoazo laked pigment that contains at least one functional moiety;
   providing a sterically bulky stabilizer compound that contains at least one functional group;
   carrying out a chemical reaction to form a monoazo laked pigment composition, whereby the functional moiety found on the pigment precursor is incorporated within the monoazo laked pigment and non-covalently associated with the functional group of the stabilizer, to form nanoscale organic pigment particles;
   providing a copolymer material comprising organic pigment-affinic functional groups and non pigment affinic monomer units;

associating the nanoscale organic pigment particles with the copolymer material to so as to effect a deposited layer or shell of the copolymer material around said nanoscale organic pigment particles, thereby producing an encapsulated nanoscale organic pigment particle; and optionally further reinforcing the encapsulated nanoscale organic pigment particle with one or more surface treatments, wherein the copolymer encapsulated nanoscale particles have an average particle diameter as measured by TEM imaging of from about 10 nm to about 200 nm, and the sterically bulky stabilizer is represented by thy; following structure:

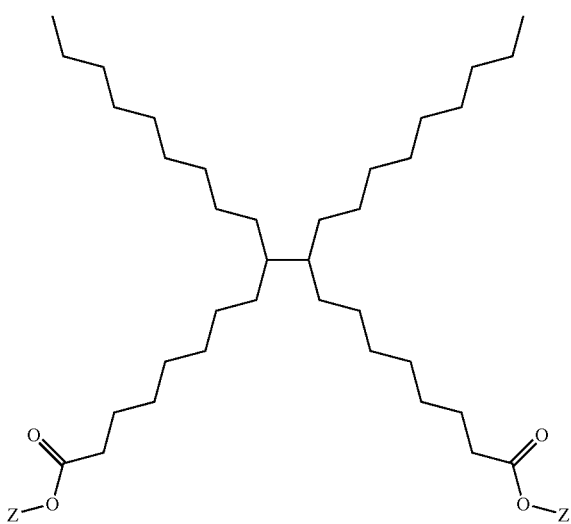

wherein Z is H, a metal cation, or an organic cation.

20. A process for preparing polymer encapsulated nanoscale particles of organic pigments, comprising:
  providing nanoscale organic pigment particles comprised of surface-associated sterically bulky stabilizer compounds;
  providing a copolymer material comprising organic pigment-affinic functional groups and non pigment affinic monomer units;
  associating the nanoscale organic pigment particles with the copolymer material so as to effect a deposited layer or shell of the copolymer material around said nanoscale organic pigment particles, thereby producing an encapsulated nanoscale organic pigment particle; and
  optionally further reinforcing the encapsulated nanoscale organic pigment particle with one or more surface treatments,
  wherein the nanoscale organic pigment particles comprise an organic pigment having at least one functional moiety and a surface-associated sterically bulky stabilizer compound having at least one functional group, wherein the functional moiety of the pigment associates non-covalently with the functional group of the stabilizer,
  the polymer encapsulated nanoscale particles have an average particle diameter as measured by TEM imaging of from about 10 nm to about 200 nm, and
  the sterically bulky stabilizer is represented by the following structure:

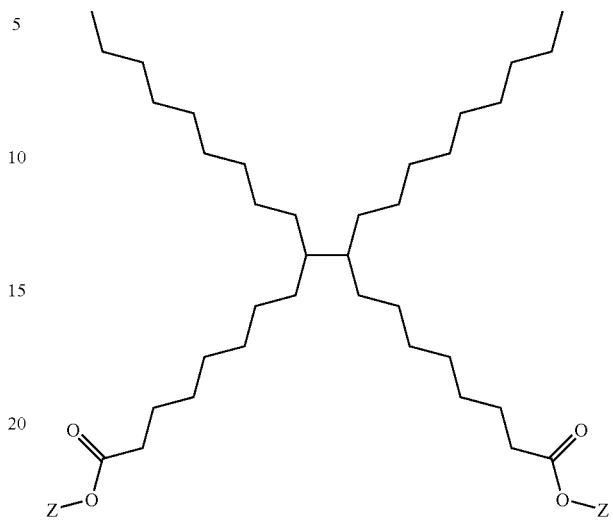

wherein Z is H, a metal cation, or an organic cation.

21. The process of claim 20, wherein the reinforcing is conducted.

22. The process of claim 20, wherein the nanoscale organic pigment particles are nanoscale particles of monoazo laked pigments, and the step of providing nanoscale organic pigment particles comprised of surface-associated sterically bulky stabilizer compounds comprises:
  providing an organic pigment precursor to a monoazo laked pigment that contains at least one functional moiety,
  providing a sterically bulky stabilizer compound that contains at least one functional group, and
  carrying out a chemical reaction to form a monoazo laked pigment composition, whereby the functional moiety found on the pigment precursor is incorporated within the monoazo laked pigment and non-covalently associated with the functional group of the stabilizer, so as to allow the formation of nanoscale pigment particles.

23. The process of claim 20, wherein the nanoscale organic pigment particles are nanoscale quinacridone pigment particles, and the step of providing nanoscale organic pigment particles comprised of surface-associated sterically bulky stabilizer compounds comprises:
  providing a first solution comprising a surface additive compound in an acid;
  adding a quinacridone pigment precursor or crude quinacridone pigment into the first solution and causing said surface additive compound to coat formed nanoscale quinacridone pigment particles; and
  adding the first solution and coated nanoscale quinacridone pigment particles into a second solution comprising deionized water to form a third solution and to precipitate the coated nanoscale quinacridone pigment particles;
  wherein the surface additive compound comprises a rosin compound.

* * * * *